(12) United States Patent
Tan et al.

(10) Patent No.: US 11,474,259 B2
(45) Date of Patent: Oct. 18, 2022

(54) POSITIONING METHOD AND DEVICE

(71) Applicant: Huawei Technologies Co., Ltd., Shenzhen (CN)

(72) Inventors: Yun Tan, Xi'an (CN); Xiaolong Wang, Xi'an (CN); Peng Li, Xi'an (CN); Wei Liu, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 263 days.

(21) Appl. No.: 16/755,031

(22) PCT Filed: Dec. 25, 2017

(86) PCT No.: PCT/CN2017/118201
§ 371 (c)(1),
(2) Date: Apr. 9, 2020

(87) PCT Pub. No.: WO2019/071838
PCT Pub. Date: Apr. 18, 2019

(65) Prior Publication Data
US 2021/0190964 A1    Jun. 24, 2021

(30) Foreign Application Priority Data

Oct. 12, 2017  (CN) .......................... 201710948820.7

(51) Int. Cl.
| G01S 19/25 | (2010.01) |
| G01S 19/05 | (2010.01) |
| G01S 19/10 | (2010.01) |
| G01S 19/23 | (2010.01) |
| H04J 3/06 | (2006.01) |

(52) U.S. Cl.
CPC ............ G01S 19/256 (2013.01); G01S 19/05 (2013.01); G01S 19/10 (2013.01); G01S 19/23 (2013.01); H04J 3/0652 (2013.01)

(58) Field of Classification Search
CPC ........ G01S 19/256; G01S 19/05; G01S 19/10; G01S 19/23
USPC .... 342/357.47, 352, 357.31, 357.42, 357.64, 342/350, 387
See application file for complete search history.

(56) References Cited

U.S. PATENT DOCUMENTS

| 9,094,907 B2 | 7/2015 | Xing et al. | |
| 2011/0102258 A1* | 5/2011 | Underbrink ............ | H04B 1/707 342/357.47 |

FOREIGN PATENT DOCUMENTS

| CN | 102037667 A | 4/2011 |
| CN | 102548039 A | 7/2012 |
| CN | 103686982 A | 3/2014 |
| CN | 104316935 A | 1/2015 |
| CN | 104902290 A | 9/2015 |
| CN | 105099649 A | 11/2015 |
| CN | 107005913 A | 8/2017 |
| CN | 107017958 A | 8/2017 |
| CN | 107196725 A | 9/2017 |

(Continued)

*Primary Examiner* — Bo Fan
(74) *Attorney, Agent, or Firm* — Slater Matsil, LLP

(57) ABSTRACT

A method includes receiving, by an electronic device, a positioning request; responding to the positioning request; determining a target time source having the highest priority in at least two time sources; providing, for a GPS chip, a target time currently corresponding to the target time source; and performing GPS positioning based on the target time.

20 Claims, 12 Drawing Sheets

(56) References Cited

FOREIGN PATENT DOCUMENTS

KR       100521137 B1   10/2005
WO    2012174716 A1   12/2012

\* cited by examiner

Electronic device

POSITIONING METHOD AND DEVICE

CROSS-REFERENCE TO RELATED APPLICATIONS

This application is a National Stage of International Application No. PCT/CN2017/118201 filed on Dec. 25, 2017, which claims priority to Chinese Patent Application No. 201710948820.7, filed on Oct. 12, 2017. Both of the aforementioned applications are hereby incorporated by reference in their entireties.

TECHNICAL FIELD

Embodiments of this application relate to the field of positioning technologies, and in particular, to a positioning method and a device.

BACKGROUND

The global positioning system (global positioning system, GPS) positioning technology is a most accurate and most widely used positioning and navigation technology currently used by electronic devices such as mobile phones and vehicles. During GPS positioning, an electronic device may inject a time parameter indicating a current time into a GPS chip, so that the GPS chip may perform satellite searching, position iterative calculation, and the like based on the injected time parameter, to accelerate a positioning speed. For example, in a process of satellite searching, the GPS chip may determine, based on satellite ephemeris, a target satellite that matches parameters such as the time parameter injected into GPS chip and a position of the electronic device, to implement quick satellite searching, and accelerate a GPS positioning speed. For another example, in a GPS positioning process, the GPS chip may set an initial value for position iterative calculation based on the injected time parameter, to reduce a quantity of times of position iterative calculation, reduce time consumption of position calculation, and improve the GPS positioning speed.

In the positioning solution provided in the prior art, when performing GPS positioning, the electronic device obtains a current NTP time from a network time protocol (network time protocol, NTP) server through a network, and injects the NTP time into the GPS chip as the time parameter, so that the GPS chip performs GPS positioning based on the current NTP time.

In the solution, limited to factors such as a specific geographical position where a user is located, and a current network condition (for example, no network connection is detected or a network is abnormal), the electronic device may not obtain an NTP time currently, or may obtain an inaccurate NTP time. When the electronic device cannot obtain the NTP time, the electronic device cannot inject a time parameter into the GPS chip, and therefore GPS positioning needs to be performed through blind searching and multiple times of position iterative calculation, resulting in a relatively low positioning speed.

In addition, during GPS positioning, a position calculation process is correlated with a product of the time parameter injected into the GPS chip and a speed of light c. A value of c is relatively large, if the time parameter is inaccurate, the product may have a big error, and therefore a quantity of times of position iterative calculation is increased, and the GPS positioning speed is relatively low. Moreover, the time parameter is inaccurate, the electronic device may fail to find a satellite based on the time parameter, or may find a satellite with low signal quality. Consequently, the electronic device needs to perform satellite searching again, further resulting in a relatively low GPS positioning speed.

SUMMARY

Embodiments of this application provide a positioning method and a device, to improve reliability and accuracy of a time parameter that is to be injected into a GPS chip, and improve a GPS positioning speed.

To achieve the foregoing objectives, the following technical solutions are used in the embodiments of this application:

According to a first aspect, an embodiment of this application provides a positioning method that can be applied to an electronic device, where the electronic device includes a global positioning system GPS chip, and the method may include: receiving, by the electronic device, a positioning request; then responding to the positioning request; determining a target time source having the highest priority in at least two time sources; providing, by the electronic device for the GPS chip, a target time currently corresponding to the target time source; and further, performing, by the electronic device, GPS positioning based on the target time. The at least two time sources include at least two of the following: an NTP time source, a GPS reference time source, a network identity and time zone (network identity and time zone, NITZ) time source, an NG time source, an NN time source, or an NG time source. A time corresponding to the GPS reference time source is obtained based on a satellite time obtained through demodulation during previous GPS positioning; a time corresponding to the NG time source is an average value of a time corresponding to the NTP time source and the time corresponding to the GPS reference time source; a time corresponding to the NN time source is an average value of the time corresponding to the NTP time source and a time corresponding to the NITZ time source; and a time corresponding to the GN time source is an average value of the time corresponding to the GPS reference time source and the time corresponding to the NITZ time source.

In this way, when a user has a positioning requirement, the electronic device may obtain, in real time in a plurality of manners, times currently corresponding to a plurality of time sources, determine in real time the most accurate time source having the highest priority in the plurality of selectable time sources, and use the time source as a time source for a time parameter that is to be injected into the GPS chip, thereby improving reliability and accuracy of the time parameter that is to be injected into the GPS chip, and improving a GPS positioning speed.

In a possible implementation, shorter positioning duration corresponding to a time source indicates a higher priority of the time source; the positioning duration corresponding to the time source is positioning duration of previous GPS positioning performed based on a time corresponding to the time source; and the positioning duration is a length of time spent on positioning calculation.

The positioning duration corresponding to the time source may be used to predict a length of time spent on GPS positioning to be subsequently performed by the electronic device based on the time source, that is, predict a speed at which GPS positioning is performed based on the time source. Therefore, the electronic device can determine, based on the positioning duration of the time source, a priority corresponding to the time source.

With reference to the foregoing possible implementation, in another possible implementation, before the determining, by the electronic device, a target time source having the highest priority in at least two time sources, the method further includes: separately performing a positioning operation periodically at a preset time interval based on a time that is corresponding to each time source and that is currently obtained, and obtaining positioning duration corresponding to each time source.

In this way, the electronic device may perform GPS positioning training periodically, so as to update in real time the positioning duration corresponding to each time source.

With reference to the foregoing possible implementations, in still another possible implementation, after the providing, by the electronic device for the GPS chip, a target time currently corresponding to the target time source, the method further includes: obtaining, by the electronic device when performing GPS positioning based on the target time, positioning duration corresponding to the target time source.

In this way, when the electronic device performs a GPS positioning task requested by the user, the electronic device may also update in real time the positioning duration corresponding to the target time source.

According to a second aspect, an embodiment of this application provides a positioning method that can be applied to an electronic device, where the electronic device includes a global positioning system GPS chip, and the method includes: receiving, by the electronic device, a positioning request; responding to the positioning request, and sequentially requesting to obtain, based on a descending order of priorities of at least two time sources, a time currently corresponding to one time source; if the electronic device successfully obtains a time currently corresponding to one time source, providing, for the GPS chip, the time that is currently corresponding to the one time source and that is successfully obtained; and then performing, by the electronic device, GPS positioning based on the target time. The at least two time sources include at least two of the following: a network time protocol NTP time source, a GPS reference time source, a network identity and time zone NITZ time source, an NG time source, an NN time source, or an NG time source. A time corresponding to the GPS reference time source is obtained based on a satellite time obtained through demodulation during previous GPS positioning; a time corresponding to the NG time source is an average value of a time corresponding to the NTP time source and the time corresponding to the GPS reference time source; a time corresponding to the NN time source is an average value of the time corresponding to the NTP time source and a time corresponding to the NITZ time source; and a time corresponding to the GN time source is an average value of the time corresponding to the GPS reference time source and the time corresponding to the NITZ time source.

In this way, when a user has a positioning requirement, the electronic device can obtain in real time the most accurate time source having the highest priority in a plurality of time sources, and use the time source as a time source for a time parameter to be injected into the GPS chip, thereby improving reliability and accuracy of the time parameter that is to be injected into the GPS chip, and improving a GPS positioning speed.

According to a third aspect, an embodiment of this application provides an electronic device, where the electronic device includes a global positioning system GPS chip, and the electronic device further includes: a receiving unit, configured to receive a positioning request; and a processing unit, configured to respond to the positioning request, and determine a target time source having the highest priority in at least two time sources, where the processing unit is further configured to provide, for the GPS chip, a target time currently corresponding to the target time source; and the GPS chip is configured to perform GPS positioning based on the target time. The at least two time sources include at least two of the following: an NTP time source, a GPS reference time source, an NITZ time source, an NG time source, an NN time source, or an NG time source. A time corresponding to the GPS reference time source is obtained based on a satellite time obtained through demodulation during previous GPS positioning; a time corresponding to the NG time source is an average value of a time corresponding to the NTP time source and the time corresponding to the GPS reference time source; a time corresponding to the NN time source is an average value of the time corresponding to the NTP time source and a time corresponding to the NITZ time source; and a time corresponding to the GN time source is an average value of the time corresponding to the GPS reference time source and the time corresponding to the NITZ time source.

In a possible implementation, shorter positioning duration corresponding to a time source indicates a higher priority of the time source; the positioning duration corresponding to the time source is positioning duration of previous GPS positioning performed based on a time corresponding to the time source; and the positioning duration is a length of time spent on positioning calculation.

With reference to the foregoing possible implementation, in another possible implementation, the processing unit is further configured to: before determining the target time source having the highest priority in the at least two time sources, separately perform a positioning operation periodically at a preset time interval based on a time that is corresponding to each time source and that is currently obtained, and obtain positioning duration corresponding to each time source.

With reference to the foregoing possible implementations, in still another possible implementation, after providing, for the GPS chip, a target time currently corresponding to the target time source, the processing unit is further configured to obtain, when GPS positioning is performed based on the target time, positioning duration corresponding to the target time source.

According to a fourth aspect, an embodiment of this application provides an electronic device, where the electronic device includes a global positioning system GPS chip, and the electronic device further includes: a receiving unit, configured to receive a positioning request; and a processing unit, configured to respond to the positioning request, and sequentially request to obtain, based on a descending order of priorities of at least two time sources, a time currently corresponding to one time source; and if a time currently corresponding to one time source is successfully obtained, provide, for the GPS chip, the time that is currently corresponding to the one time source and that is successfully obtained, where the GPS chip is configured to perform GPS positioning based on the target time. The at least two time sources include at least two of the following: an NTP time source, a GPS reference time source, an NITZ time source, an NG time source, an NN time source, or an NG time source. A time corresponding to the GPS reference time source is obtained based on a satellite time obtained through demodulation during previous GPS positioning; a time corresponding to the NG time source is an average value of a time corresponding to the NTP time source and the time corresponding to the GPS reference time source; a time corresponding to the NN time source is an average value of the time corresponding to the NTP time source and a time corresponding to the NITZ time source; and a time corresponding to the GN time source is an average value of the time corresponding to the GPS reference time source and the time corresponding to the NITZ time source.

According to a fifth aspect, an embodiment of this application provides an electronic device, including one or more processors and one or more memories. The one or more memories are coupled to the one or more processors, and the one or more memories are configured to store computer program code. The computer program code includes a computer instruction, and when the one or more processors execute the computer instruction, the electronic device performs the positioning method in any one of the first aspect or the second aspect.

According to a sixth aspect, an embodiment of this application provides a computer storage medium including a computer instruction. When the computer instruction runs on an electronic device, the electronic device is enabled to perform the positioning method in any one of the first aspect or the second aspect.

According to a seventh aspect, an embodiment of this application provides a computer program product. When the computer program product runs on a computer, the computer is enabled to perform the positioning method in any one of the first aspect or the second aspect.

DETAILED DESCRIPTION OF ILLUSTRATIVE EMBODIMENTS

Figure 1:
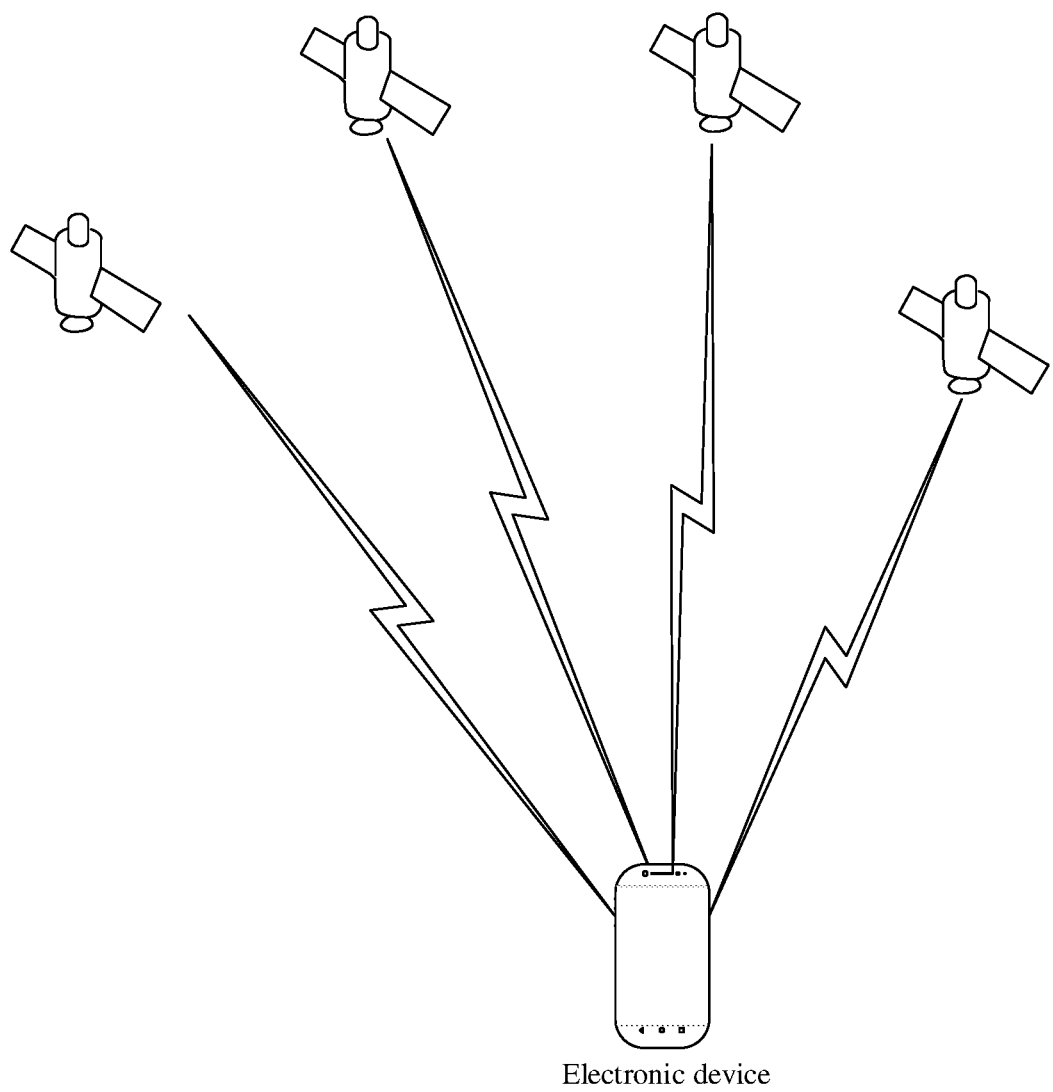
FIG. 1 is a schematic diagram of a positioning principle according to an embodiment of this application.

A process in which an electronic device performs GPS positioning is briefly described in the following:

A satellite in a GPS system constantly broadcasts a position of the satellite, sends a position data packet, and adds a time stamp, denoting a time at which the data packet is sent, into the data packet at the same time. After performing satellite searching, the electronic device receives a position data packet sent by a satellite. Theoretically, after the electronic device receives the data packet, transmission duration of the data packet in the air can be obtained by subtracting the time in the time stamp from a current time determined by the electronic device. A product of the transmission duration of the data packet in the air and a speed of light is a distance between the electronic device and the satellite. A position of the electronic device on the ground is represented by 3-dimensional spatial coordinates (x, y, z), that is, includes three unknown parameters, so that position coordinates of the electronic device can be obtained based on three equations respectively corresponding to distances between the electronic device and three satellites. However, actually, because a value of the speed of light is large, a minor time error may cause a large distance error. In addition, a clock difference between a clock of the electronic device and a caesium atomic clock of the satellite is relatively large, and accuracy of the current time determined by the electronic device is low, and consequently distances and coordinates that are obtained through calculation have relatively large errors. Therefore, in actual application, referring to FIG. 1, a "current time (or clock difference)" of the electronic device is used as a fourth unknown parameter for position calculation. The electronic device determines position coordinates of the electronic device based on at least four satellites with known positions and four equations, to reduce positioning errors caused by a time precision difference of the electronic device. In addition, the position of the electronic device is calculated based on four or more satellites, so that errors caused because the speed of light is affected by the ionosphere are reduced, and position broadcast errors of a GPS satellite are reduced.

A process of solving a position of an electronic device is an iterative calculation process, and an initial value, required during calculation, of the "current time (or clock difference) parameter" of the electronic device may be randomly set. Because a time parameter that is to be injected into a GPS chip may represent a "current time parameter" of the electronic device more accurately, the electronic device can set, based on the time parameter that is to be injected into the GPS chip, the initial value of the fourth unknown parameter: the "current time (or clock difference) parameter", so that iterative calculation can be performed based on a more accurate "current time parameter", thereby reducing a quantity of times of iterative calculation and position calculation time, and accelerating a GPS positioning speed.

Figure 2:
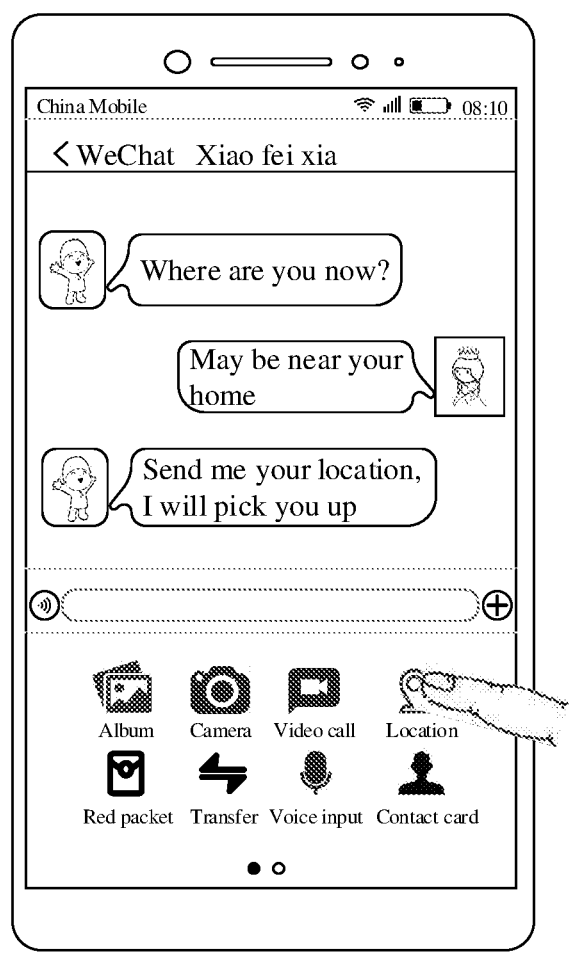
FIG. 2 is a schematic diagram of a positioning scenario corresponding to a positioning method in the prior art.
Figure 3:
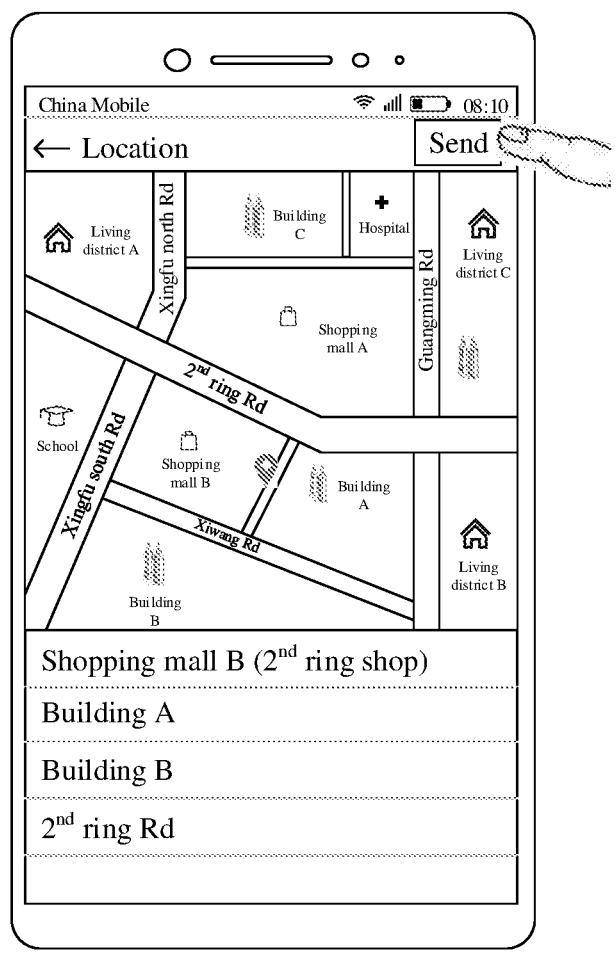
FIG. 3 is a schematic diagram of another positioning scenario corresponding to a positioning method in the prior art.
Figure 4:
FIG. 4 is a schematic diagram of still another positioning scenario corresponding to a positioning method in the prior art.

For example, FIG. 2 to FIG. 4 show a specific scenario in which an electronic device such as a mobile phone performs GPS positioning. In FIG. 2, a user of the mobile phone taps a location-based service in WeChat. In FIG. 3, a GPS chip of the mobile phone performs GPS positioning, to obtain a current position of the mobile phone. In FIG. 4, the mobile phone sends the position obtained through positioning to a WeChat friend.

Figure 5:
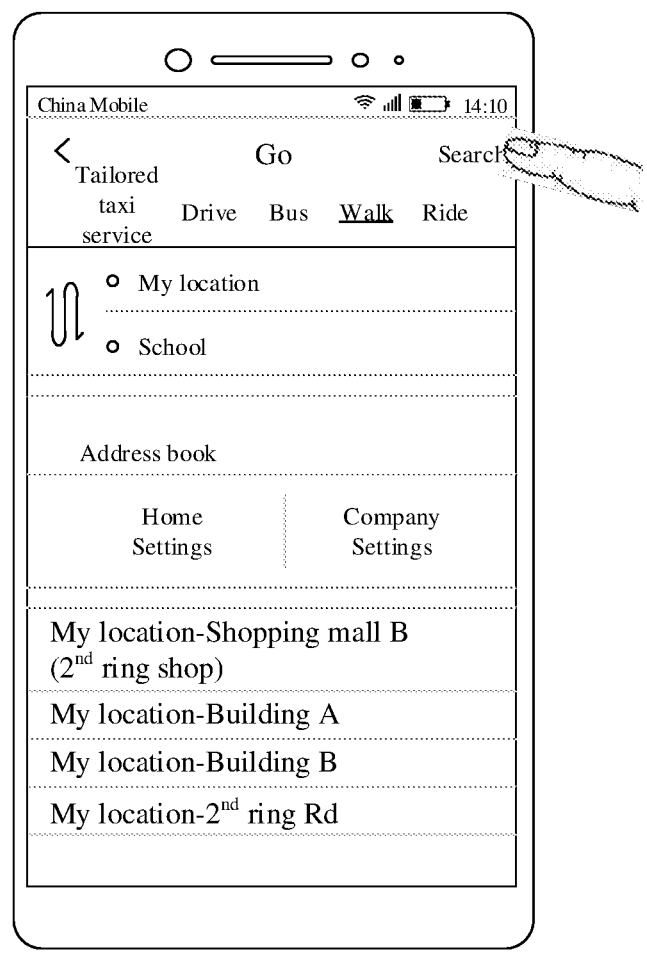
FIG. 5 is a schematic diagram of a navigation scenario corresponding to a positioning method in the prior art.
Figure 6:
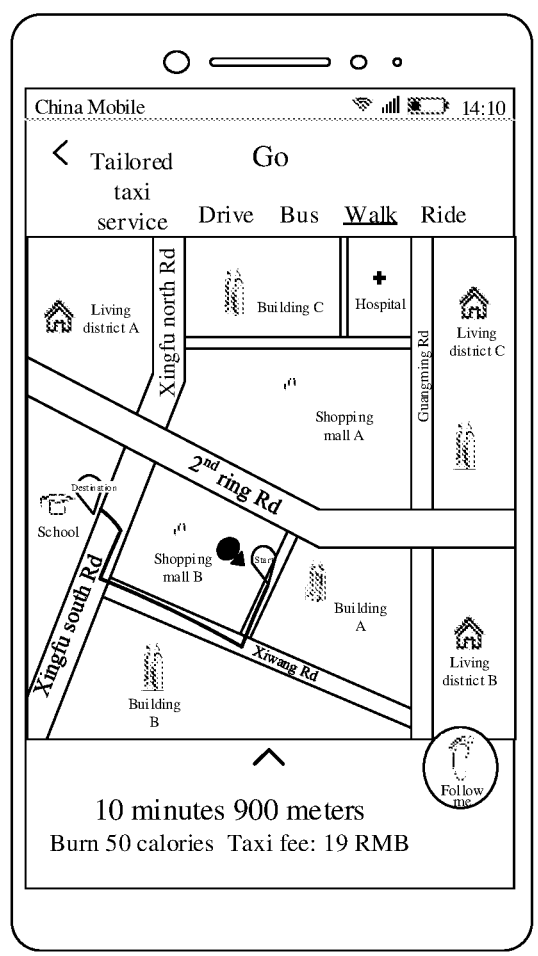
FIG. 6 is a schematic diagram of another navigation scenario corresponding to a positioning method in the prior art.

For another example, FIG. 5 and FIG. 6 are a schematic diagram of a scenario in which a mobile phone performs GPS navigating. Navigating is process in which positioning is constantly performed. For example, in the navigating process, the mobile phone may perform positioning once every one minute.

In the prior art, due to constraints of a geographic position, a network condition, and the like, the electronic device cannot obtain an NTP time, and therefore cannot inject a time parameter into the GPS chip; or may obtain an inaccurate NTP time, and therefore inject an inaccurate time parameter into the GPS chip, resulting in a low GPS positioning speed. However, according to a positioning method provided in the embodiments of this application, a time source having the highest priority and reliability, and higher accuracy is determined in a plurality of selectable time sources and used as a time parameter to be injected into the GPS chip, so that a probability that the GPS chip can obtain the time reference is larger, accuracy of the time parameter obtained by the GPS chip is higher, and therefore the GPS chip can improve the GPS positioning speed based on the accurate time parameter.

For ease of understanding, examples of only a part of related concepts of the embodiments of this application are described as follows for reference:

Ephemeris: Tables of accurate positions or trajectories of celestial bodies during motion over time, and a function of time, describing an expression of a position and a speed of a moving object in space, or also referred to as a two-line orbital data system. A mathematical relationship between six orbital parameters in Kepler's laws is used to determine parameters such as a time, coordinates, orientation, and a speed of a moving object, and is further used to accurately calculate, predict, describe, and track moving statuses such as a time, a position, and a speed of a satellite and a moving object.

Navigation: A process in which an electronic device moves from one place to another place through multiple times of positioning, monitoring and controlling.

NTP: A protocol used to synchronize a time between various computers in a network, and further used to synchronize a clock of a computer to an international standard time given by an atomic clock.

NITZ: A mechanism used to automatically configure a local time and date, and at the same time provide information about carriers for a mobile device through a wireless network.

The following describes the technical solutions in the embodiments of this application with reference to the accompanying drawings in the embodiments of this application. In description of the embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in the embodiments of this application, "a plurality of" means two or more than two.

The device in the embodiments of this application is a device used for positioning, for example, may be user equipment (User Equipment, UE), an access terminal, a UE unit, a UE station, a mobile station, a mobile console, a remote station, a remote terminal, a mobile device, a UE terminal, a terminal, a wireless communications device, a UE agent, a UE apparatus, or the like. The access terminal may be a cellular phone, a cordless phone, a session initiation protocol (session initiation protocol, SIP) phone, a wireless local loop (wireless local loop, WLL) station, a personal digital assistant (personal digital assistant, PDA), a handheld device or a computing device having a wireless communication function, another processing device connected to a wireless modem, a vehicle-mounted device, airborne equipment, shipboard equipment, a wearable device, or the like. For example, the access terminal may specifically be a mobile phone, a tablet computer, a notebook computer, an ultra-mobile personal computer (Ultra-mobile Personal Computer, UMPC), a netbook, or the like.

Figure 7:
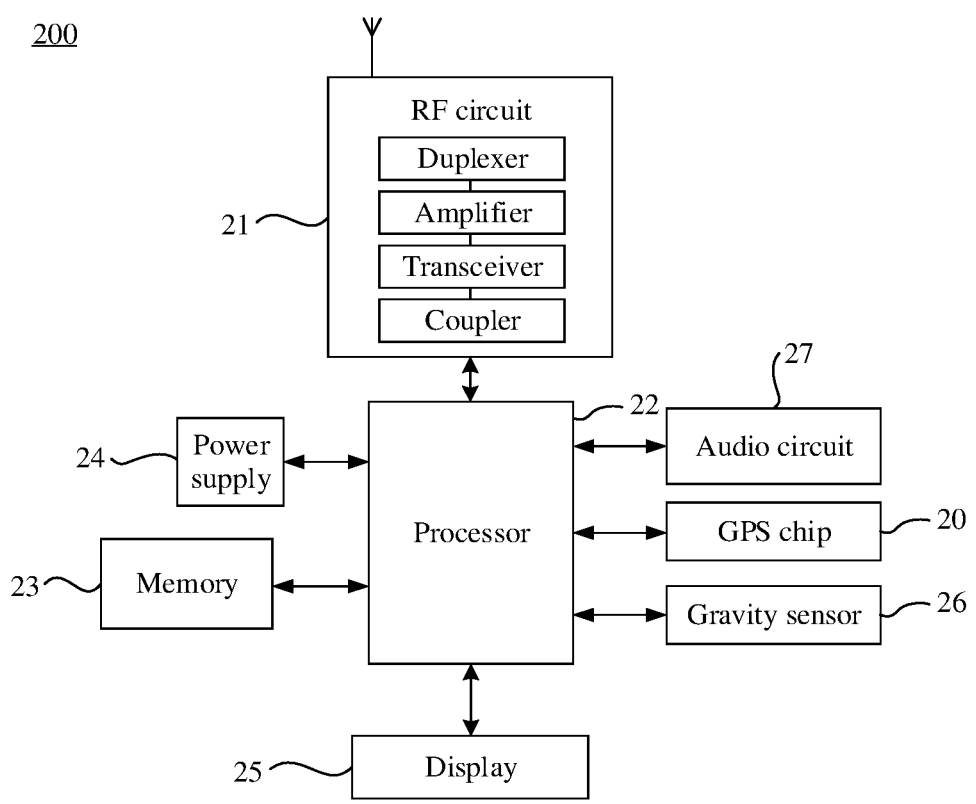
FIG. 7 is a schematic structural diagram of an electronic device according to an embodiment of this application.

That the electronic device is a mobile phone is used as an example to describe a universal hardware architecture of the mobile phone. As shown in FIG. 7, a mobile phone 200 may include components such as a GPS chip 20, a radio frequency (radio frequency, RF) circuit 21, a processor 22, a memory 23, a power supply 24, a display 25, a gravity sensor 26, an audio circuit 27, a loudspeaker 28, and a microphone 29. These components may be connected by using a bus, or may be directly connected. A person skilled in the art may understand that, the mobile phone structure shown in FIG. 7 does not constitute a limitation to the mobile phone. The mobile phone may include more or fewer components than those shown in the FIG. 7, or may combine some components, or may have a different component layout.

The GPS chip 20 may be configured to receive a satellite signal, and calculate parameters such as a pseudorange, latitude and longitude, a height, and a time correction value based on the satellite signal, so that the mobile phone 200 can perform positioning, navigating, speed measurement, time synchronization, and the like based on these parameters. Specifically, the GPS chip 20 may be configured to perform satellite searching and position iterative calculation based on a time injected by the mobile phone 200, so as to perform GPS positioning, and further obtain, through demodulation of the satellite signal, a satellite time at which positioning succeeds.

The RF circuit 21 may be configured to send and receive signals in an information sending and receiving process or in a call process. Particularly, the RF circuit 21 delivers received information to the processor 22 for processing, and sends a signal generated by the processor 22. Generally, the RF circuit 21 may include but is not limited to an antenna, at least one amplifier, a transceiver, a coupler, a low noise amplifier (low noise amplifier, LNA), a duplexer, and the like. In addition, the RF circuit 21 may also communicate with a network and other devices by means of radio communication.

The processor 22 is a control center of the mobile phone 200, and uses various interfaces and lines to connect all parts of the entire mobile phone. By running or executing a software program or a module or both that are stored in the memory 23 and invoking data stored in the memory 23, the processor 22 executes various functions of the mobile phone 200 and processes data, so as to perform overall monitoring on the mobile phone 200. During specific implementation, in an embodiment, the processor 22 may include one or more processing units. The processor 22 may be integrated with an application processor and a modem processor. The application processor mainly processes an operating system, a user interface, an application program, and the like. The modem processor mainly processes wireless communications. It may be understood that the foregoing modem processor may not be integrated into the processor 22.

The memory 23 may be configured to store data, a software program, and a module, may be a volatile memory (volatile memory), for example, a random access memory (random-access memory, RAM); or a nonvolatile memory (non-volatile memory), for example, a read-only memory (read-only memory, ROM), a flash memory (flash memory), a hard disk drive (hard disk drive, HDD), or a solid state disk (solid-state drive, SSD); or a combination of the foregoing types of memories. Specifically, the memory 23 may store program code, and the program code is used by the processor 22 to perform the positioning method provided in the embodiments of this application by executing the program code.

The power supply 24 may be a battery, may be logically connected to the processor 22 by using a power supply management system, so as to implement, by using the power supply management system, functions such as charging management, discharging management, and power consumption management. The display 25 may be referred to as a display panel, configured to display a user interface. The display 25 may alternatively be a touch panel, configured to implement input and output functions of the mobile phone 200. The gravity sensor (gravity sensor) 26 may detect magnitude of acceleration of the mobile phone in various directions (which are generally tri-axial), may detect magnitude and a direction of gravity when the mobile phone is static, and may be used for an application that identifies a mobile phone gesture (for example, switching between a horizontal screen and a vertical screen, a related game, and magnetometer gesture calibration), a function related to vibration identification (for example, a pedometer and a knock), and the like. It should be noted that, the mobile phone 200 may further include another sensor, for example, a pressure sensor, an optical sensor, a gyroscope, a barometer, a hygrometer, a thermometer, an infrared sensor, and other sensors. Details are not described herein.

Although not shown, the mobile phone 200 may further include function modules such as a wireless-fidelity (Wireless-Fidelity, WiFi) module, a Bluetooth module, and a camera. Details are not described herein.

Figure 8:
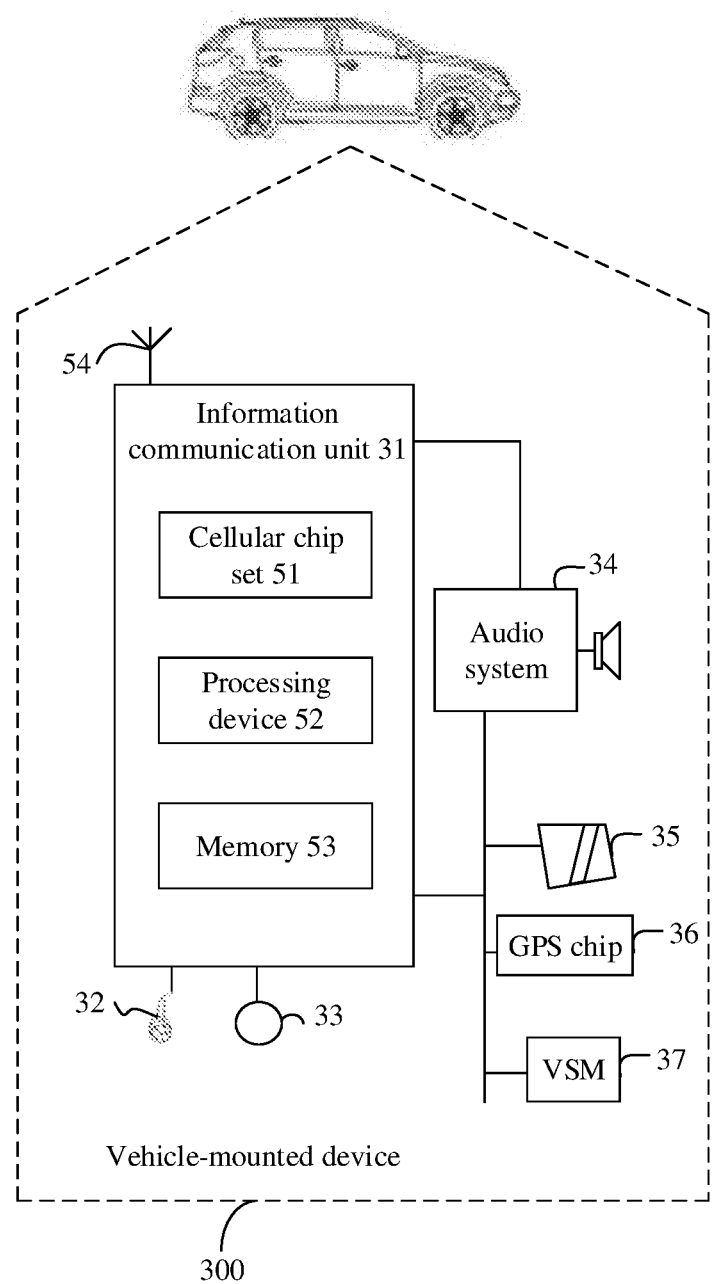
FIG. 8 is a schematic structural diagram of another device according to an embodiment of this application.

That the electronic device is a vehicle-mounted device is used as an example to describe a universal hardware architecture of the vehicle-mounted device. As shown in FIG. 8, a vehicle-mounted device 300 may include an information communication unit 31, a microphone 32, one or more buttons or another control input 33, an audio system 34, a visual display 35, a GPS chip 36, and a plurality of vehicle security modules (vehicle security module, VSM) 37, and the like.

The information communication unit 31 may perform communication through a cellular network based on a global system for mobile communications (global system for mobile communication, GSM) or code division multiple access (code division multiple access, CDMA) standard. Therefore, the information communication unit 31 may include a standard cellular chip set 51 used for audio communication (for example, hands-free calling), a wireless modem used for data transmission, an electronic processing device 52, one or more digital memories 53, and a dual antenna 54, and the like. It should be understood that, the modem can be implemented by using software stored in the information communication unit and executed by the processor 52, or the modem can be separate hardware components located inside or outside the information communication unit 31. Wireless networking between the vehicle-mounted device and another networking device can also be performed through the information communication unit 31.

The processor 52 may be a device of any type that can process an electronic instruction, including a microprocessor, a microcontroller, a main processor, a controller, a communication processor of a vehicle-mounted device, and an application-specific integrated circuit. The processor 52 can be a special purpose processor used for only the information communication unit 31, or can be shared by another vehicle-mounted device. The processor 52 executes various types of digital storage instructions, for example, software or firmware program stored in the memory 53, and can enable the information communication unit to provide a variety of services. For example, the processor 52 can execute program or process data, to perform at least a part of the method discussed in the specification.

The GPS chip 36 may be configured to receive a radio satellite signal from a satellite system. The GPS chip 36 can determine, based on the received satellite signal, a position of the vehicle-mounted device. The position of the vehicle-mounted device is used to provide navigation and other position related services for a driver of the vehicle-mounted device. Navigation information can be presented on the display 35 (or another display in the vehicle-mounted device), or may be presented in language, for example, completed when steering navigation is provided. A navigation service can be provided by using a special purpose navigation module (may be a part of the GPS chip 36) in the vehicle-mounted device. Alternatively, some or all navigation services may be completed by the information communication unit 31. Position information is sent to a remote position, so as to provide a navigation map, map labels, route calculation, and the like for the vehicle-mounted device. The position information can be provided for a call center, or another remote computer system, for example, a computer, to be used for other purposes such as fleet management. In addition, new or updated map data can be downloaded to the GPS chip 36 through the information communication unit 31.

For clearer descriptions, the mobile phone shown in FIG. 7 is used as an example to describe the positioning method and the electronic device provided in the embodiments of this application in detail with reference to the following steps.

Figure 9:
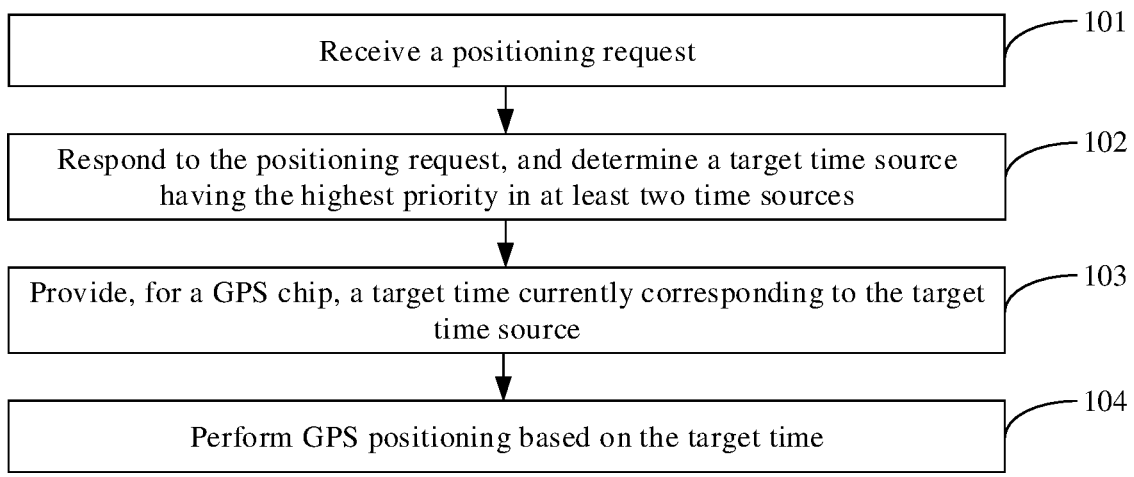
FIG. 9 is a flowchart of a positioning method according to an embodiment of this application.

Referring to FIG. 9, an embodiment of this application provides a positioning method. When a GPS positioning task is performed, the method may include the following steps.

101. A mobile phone receives a positioning request.

When a user has a positioning requirement, the user may send a GPS positioning request to the mobile phone. For example, in the scenario shown in FIG. 2, when the user taps a position icon in WeChat, it may be considered that a positioning request is sent to the mobile phone. When the mobile phone receives the operation of tapping the position icon by the user, it may be considered that the positioning request of the user is received.

102. The mobile phone responds to the positioning request, and determines a target time source having the highest priority in at least two time sources.

In step 102, the at least two time sources include at least two of the following: a network time protocol NTP time source, a GPS reference time source, a network identity and time zone NITZ time source, an NG time source, an NN time source, or an NG time source. A time corresponding to the GPS reference time source is obtained based on a satellite time obtained through demodulation during previous GPS positioning. An NG time corresponding to the NG time source is an average value of an NTP time corresponding to the NTP time source and the GPS reference time corresponding to the GPS reference time source. An NN time corresponding to the NN time source is an average value of the NTP time corresponding to the NTP time source and an NITZ time corresponding to the NITZ time source. A GN time corresponding to the GN time source is an average value of the GPS reference time corresponding to the GPS reference time source and the NITZ time corresponding to the NITZ time source.

Specifically, an NTP time currently corresponding to the NTP time source may be a current time value obtained by the mobile phone in real time from an NTP server through a network. An NITZ time currently corresponding to the NITZ time source may be a current time value obtained by the mobile phone in real time from an access network device (for example, a base station), and the NITZ time is usually provided and maintained by carriers. A GPS reference time currently corresponding to the GPS reference time source is obtained based on a satellite time obtained through demodulation during previous GPS positioning.

The GPS reference time may be represented as follows:

$$\text{GPS reference time} = \text{Satellite time} + (\text{SCTM 2} - \text{SCTM 1}) \quad \text{Formula 1}$$

In Formula 1, the satellite time is a time obtained by the mobile phone through demodulation and calculation based on satellite signals of a plurality of satellites during previous successful positioning. SCTM 1 is a time of a system of the mobile phone that is obtained by the mobile phone based on a function System.currentTimeMillis( ) during previous successful positioning. SCTM 2 is a current time of the system of the mobile phone that is obtained by the mobile phone based on a function System.currentTimeMillis( ).

In another implementation, the satellite time may alternatively be a time that is obtained through demodulation based on a satellite signal and that is within a preset interval (for example, six hours) from a current time during specific successful positioning. Correspondingly, SCTM 1 may be a time of the system of the mobile phone that is obtained by the mobile phone based on the function System.currentTimeMillis( ) during the specific successful positioning.

Specifically, the time obtained based on the System.currentTimeMillis( ) is on a millisecond scale, and the time of the system of the mobile phone may be adjusted based on manual setting of the user, or may be adjusted based on the NTP time source or the NITZ time source, and further maintained by using a clock in the mobile phone. However, a timing error of the clock in the mobile phone is relatively large, especially, a technical error of the clock in the mobile phone is larger after a long time, and consequently an error of a time difference between SCTM 2 and SCTM 1 is relatively large. Therefore, when there is a relatively large time interval (for example, longer than 24 hours) between the satellite time corresponding to the previous successful positioning and the current time, a method for calculating a current GPS reference time based on the satellite time corresponding to the previous successful positioning and the time difference between SCTM 2 and SCTM 1 becomes invalid, and the mobile phone cannot obtain the current GPS reference time (Alternatively, in this case, it may also be considered that the GPS reference time that is obtained by the mobile phone or the GPS reference time source is invalid).

Because the NG time is an average value of the NTP time and the GPS reference time source, compared with the NTP time and the GPS reference time source, the NG time can reflect a current time value more accurately. Similarly, compared with the NTP time and the NITZ time, the NN time can reflect a current time value more accurately. Compared with the GPS reference time source and the NITZ time, the GN time can reflect a current time value more accurately.

In this embodiment of this application, a priority of a time source may reflect reliability of the time source, and the reliability of the time source includes accuracy of the time source or a probability that the time source can be obtained. Because a time source that may be obtained by the mobile phone is not limited to only the NTP time source used in the prior art, there may be another time source, for example, the GPS reference time source, the NITZ time source, the NG time source, the NN time source, or the GN time source. Therefore, when performing GPS positioning, the mobile phone may select a time source having the highest priority and reliability from at least two time sources of the six time sources, and use a time corresponding to the time source as the time parameter to be injected into the GPS chip.

103. The mobile phone provides, for the GPS chip, a target time currently corresponding to the target time source.

After the mobile phone determines the target time source having the highest priority, the mobile phone may invoke native_inject_time by injecting a function handleInjectNtpTime, so as to use the target time, namely a time currently corresponding to the target time source, as the time parameter to be injected into the GPS chip.

104. The mobile phone performs GPS positioning based on the target time.

After the mobile phone injects the target time into the GPS chip, the GPS chip in the mobile phone may perform GPS positioning based on the target time.

In the prior art, due to a constraint of a geographic position, a network condition, or the like, the mobile phone may not obtain the NTP time source, and therefore cannot inject the time parameter into the GPS chip. However, in this embodiment of this application, the mobile phone may select one time source from the plurality of time sources, so that a time corresponding to the selected time source is used as the time parameter to be injected into the GPS chip. Therefore, there are more types of time sources that may be selected by the mobile phone and injected into the GPS chip, a probability that the mobile phone injects the time parameter into the GPS chip is larger, a probability that the GPS chip obtains the time parameter is larger, and therefore reliability of improving a GPS positioning speed by the GPS chip based on the injected time parameter is higher.

For example, in this embodiment of this application, when the mobile phone cannot obtain the NTP time source due to the constraint of the geographic position, the network condition, or the like, the mobile phone may inject another time source that can be obtained (for example, the GPS reference time source, the NITZ time source, or the GN time source) into the GPS chip.

In addition, in the prior art, due to the constraint of the geographic position, the network condition, or the like, the mobile phone may obtain an inaccurate NTP time, and consequently the time parameter injected by the mobile phone into the GPS chip is inaccurate, resulting in a low GPS positioning speed. Therefore, the solution has a stringent requirement on the geographic position and the network condition of the mobile phone. However, according to the positioning method provided in this embodiment of this application, times currently corresponding to the plurality of time sources may be obtained in a plurality of manners, and a time source having the highest priority, reliability and accuracy may be determined in the plurality of selectable time sources and used as the time parameter to be injected into the GPS chip, so that the GPS chip can perform positioning based on the more accurate time parameter, thereby improving the GPS positioning speed without the stringent requirement on the geographic position and the network condition of the mobile phone.

In addition, because an environment and a network status of the mobile phone change in real time, obtaining manners of different time sources are different, types of time sources currently corresponding to a time that may be successfully obtained by the mobile phone change in real time, and accuracy of a time that is currently corresponding to a time source and that is successfully obtained also changes in real time. Therefore, in the prior art, it is inevitably inaccurate to constantly use only the NTP time source as the time parameter to be injected into the GPS chip. In this embodiment of this application, when there is a need for positioning, a time source having the highest priority and accuracy is determined in real time and used as a time source for the time parameter to be injected into the GPS chip, thereby improving accuracy of the time parameter, and improving the GPS positioning speed.

Therefore, according to the positioning method provided in this embodiment of this application, when a user has a positioning requirement, times currently corresponding to the plurality of time sources are obtained in real time in a plurality of manners, and a time source having the highest priority and accuracy is determined in real time in the plurality of selectable time sources and used as a time source for the time parameter to be injected into the GPS chip, thereby improving reliability and accuracy of the time parameter that is to be injected into the GPS chip, and improving the GPS positioning speed.

In a specific implementation, in the at least two time sources in step 101, a priority of a time source currently corresponding to a time that may be currently successfully obtained by the mobile phone is higher than a priority of a time source currently corresponding to a time that may not be successfully obtained by the mobile phone.

Specifically, although not shown in the accompanying drawings, that the mobile phone determines the target time source having the highest priority in the at least two time sources in the foregoing step 102 may include the following steps.

1021. The mobile phone requests to obtain times currently corresponding to the at least two time sources.

The mobile phone may request to obtain a time currently corresponding to each of the at least two time sources. Due to a network failure, a time interval, or the like, the NTP time, the GPS reference time source, or the NITZ time may be successfully obtained by the mobile phone, or may not be successfully obtained by the mobile phone.

When the mobile phone does not obtain a time value currently corresponding to a specific time source, or when a time value that is currently corresponding to a specific time source and that is obtained by the mobile phone is an invalid value (For example, a value of the time is a preset value 0), it may be considered that the mobile phone fails to obtain the time currently corresponding to the time source. For the GPS reference time source, if the mobile phone is restarted or a time interval from a time of previous successful positioning to a current time is longer, the mobile phone cannot successfully obtain a GPS reference time currently corresponding to the GPS reference time source.

1022. If the mobile phone successfully obtains only one time source, a priority of the time source corresponding to the time that is successfully obtained is the highest, and the mobile phone determines that the time source corresponding to the time that is successfully obtained is the target time source.

On a basis of step 1022, the mobile phone may inject the time that is currently corresponding to the target time source and that is successfully obtained in step 103 into the GPS chip.

1023. If the mobile phone successfully obtains times currently corresponding to m time sources, where m is a positive integer, priorities of the m time sources are higher than a priority of another time source, and the mobile phone determines a target time source having the highest priority in the m time sources.

For example, if the at least two time sources in step 101 include three time sources: the NTP time source, the GPS reference time source, and the NITZ time source, the mobile phone may separately obtain times currently respectively corresponding to the NTP time source, the GPS reference time source, and the NITZ time source in step 1021. In step 1022, if the mobile phone determines that only the NITZ time currently corresponding to the NITZ time source is successfully obtained, the mobile phone may determine that a priority of the NITZ time source is higher than those of the NTP time source and the GPS reference time source, and the mobile phone may inject the NITZ time that is successfully obtained into the GPS chip. In step 1023, if the mobile phone obtains the NITZ time and the GPS reference time source that are respectively corresponding to the NITZ time source and the GPS reference time source, the mobile phone may determine, in the NITZ time source and the GPS reference time source, a time source having the highest priority as the target time source, and inject a target time corresponding to the target time source into the GPS chip.

In some embodiments, the mobile phone may store a preset correspondence between a time source and a priority. For example, referring to Table 1, the at least two time sources in step 101 include the NTP time source, the GPS reference time source, and the NITZ time source. The priority of the NTP time source is the highest, the priority of the GPS reference time source is the middle, and the priority of the NITZ time source is the lowest. When the mobile phone successfully obtains the NTP time, the GPS reference time source, and the NITZ time in the foregoing step 1023, it can be determined that the NTP time source having the highest priority is the target time source, and the NTP time is injected into the GPS chip. When the mobile phone successfully obtains the GPS reference time and the NITZ time in the foregoing step 1023, the mobile phone may determine the GPS reference time source having the highest priority as the target time source, and therefore inject the GPS reference time into the GPS chip.

TABLE 1

| Time source | Priority |
| --- | --- |
| NTP time source | Highest |
| GPS reference time source | Middle |
| NITZ time source | Lowest |

For another example, referring to Table 2, the at least two time sources in step 101 include six time sources: the NTP time source, the GPS reference time source, the NITZ time source, the NG time source, the NN time source, and the GN time source, and the six time sources may be arranged in a descending order of corresponding priorities as follows: the NG time source, the NTP time source, the NN time source, the GN time source, the GPS reference time source, and the NITZ time source. Because the priority corresponding to the NG time source is the highest, so that in step 1023, if the mobile phone successfully obtains the NG time, and a time currently corresponding to another time source, the mobile phone may determine the NG time source having the highest priority as the target time source, and therefore inject the NG time into the GPS chip.

TABLE 2

| Time source | Priority |
|---|---|
| NG time source | 1 |
| NTP time source | 2 |
| NN time source | 3 |
| GN time source | 4 |
| GPS reference time source | 5 |
| NITZ time source | 6 |

In Table 2, priorities corresponding to different time sources are arranged in a descending order from 1 to 6.

In addition, different mobile phone users may preset, in the mobile phone based on preference of the user, an order of priorities corresponding to different time sources. For example, because the NITZ time is usually easily obtained, the user may prefer to use the NITZ time, and therefore the priority of the NITZ time may be set as the highest.

In some other embodiments, priorities corresponding to time sources may change in real time. For example, shorter positioning duration corresponding to a time source indicates a higher priority of the time source. The positioning duration is a length of time spent on positioning calculation. In a specific representation manner, the positioning duration may be a time interval from a time at which the GPS chip receives the positioning request indicated by the system of the mobile phone and a time at which the GPS chip returns positioning data (for example, position coordinates) to the system of the mobile phone.

Positioning duration corresponding to a time source is positioning duration of previous GPS positioning performed based on a time corresponding to the time source. The previous GPS positioning performed based on the time corresponding to the time source may include previous positioning training performed based on the time corresponding to the time source or a previous positioning task requested by the user and performed based on the time corresponding to the time source. The positioning duration of previous GPS positioning performed based on the time corresponding to the time source can reflect and predict a real-time status of a time currently required by the mobile phone for performing positioning based on the time source. Therefore, if the positioning duration corresponding to the time source is shorter, a priority corresponding to the time source is higher. This may indicate that positioning duration corresponding to subsequent positioning to be performed by the mobile phone based on the time source is shorter, and the time source is a more accurate time source to be injected into the GPS chip.

Figure 10:
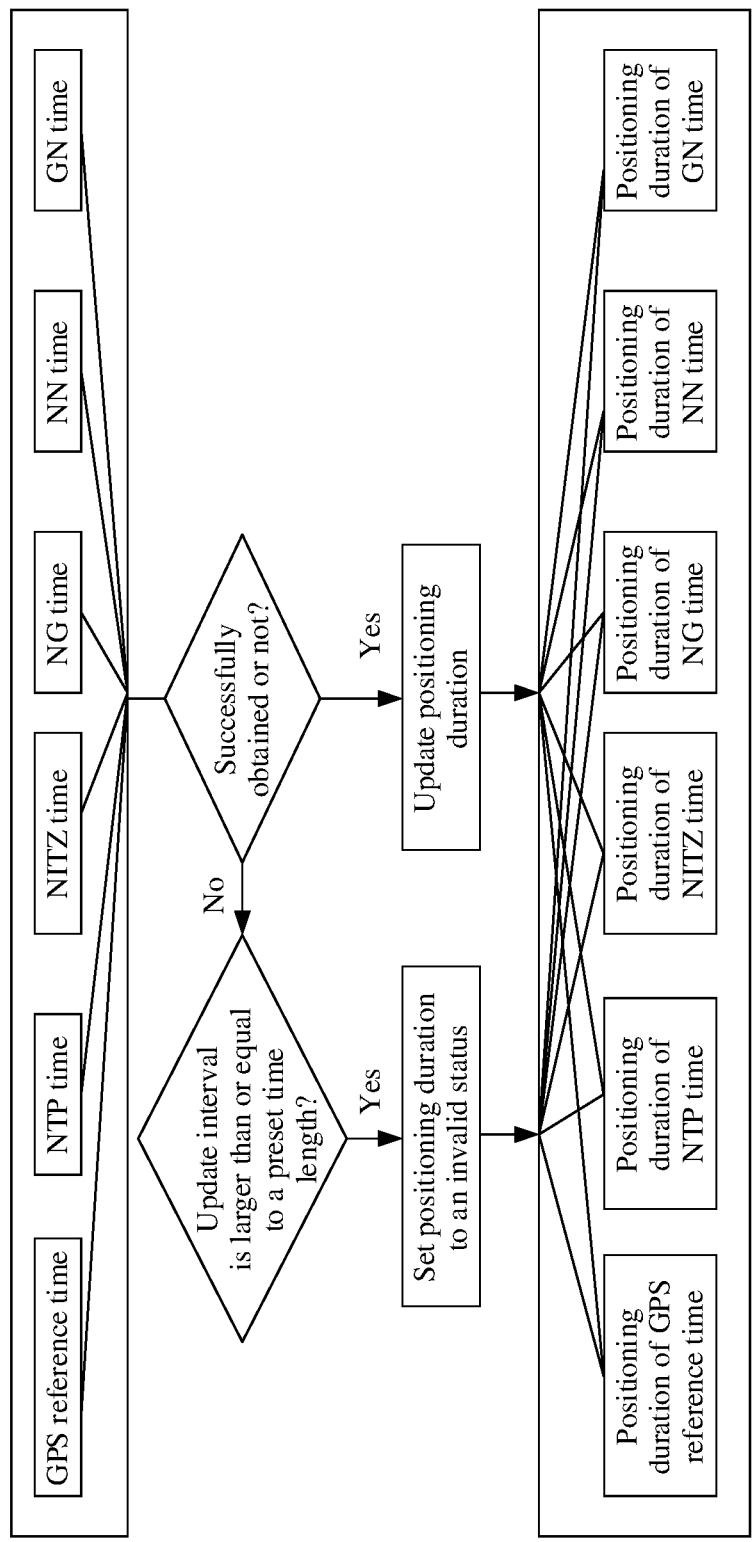
FIG. 10 is a flowchart of positioning training according to an embodiment of this application.
Figure 11:
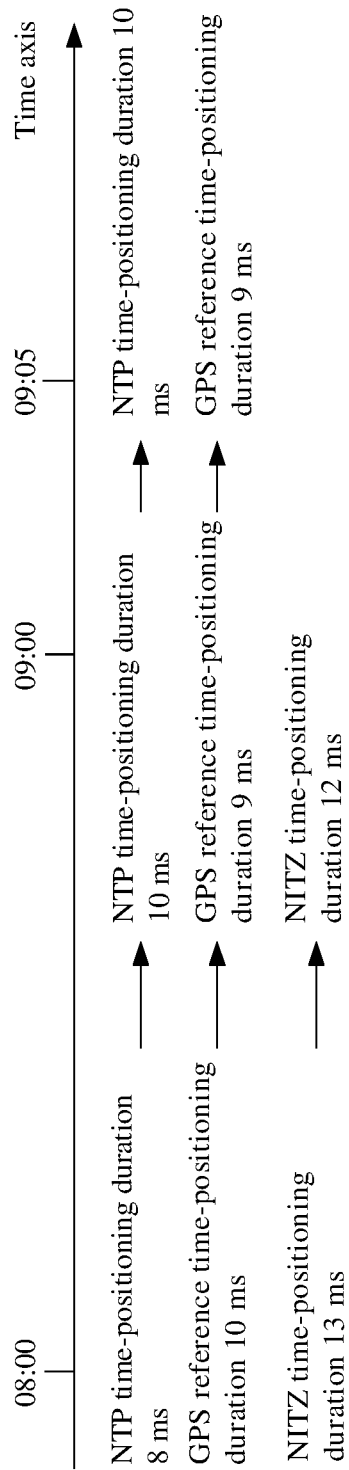
FIG. 11 is a diagram of a time sequence according to an embodiment of this application.

In this embodiment of this application, referring to FIG. 10, before the foregoing step 102, the method may further include the following step:

105. The mobile phone separately performs a positioning operation periodically at a preset time interval based on a time that is corresponding to each time source and that is currently obtained, and obtains positioning duration corresponding to each time source.

In step 105, the mobile phone may separately perform the positioning operation periodically at the preset time interval based on the time that is corresponding to each time source and that is currently obtained, and obtain the positioning duration corresponding to each time source, so that the mobile phone may perform positioning training in background before receiving the positioning request of the user, to update the positioning duration corresponding to each time source in real time. Further, the mobile phone may determine a priority of a time source based on positioning duration corresponding to the time source, to determine a time source having the highest priority.

Specifically, in a specific implementation, if the at least two time sources in step 101 include n time sources, where n is a positive integer greater than 1, for an $i^{th}$ time source in the n time sources, i is any one of positive integers from 1 to n, and step 105 may specifically include the following step:

1051. At a preset time, if the mobile phone successfully obtains a time corresponding to an $i^{th}$ time source, the mobile phone performs positioning based on the $i^{th}$ time source, to update positioning duration corresponding to the $i^{th}$ time source.

The preset time is corresponding to the preset time interval, the preset time interval may be set based on an actual requirement. For example, the preset time interval may be set to one hour, the preset time may be a time that occurs every one hour. For example, the preset time may specifically be any time by hours such as 08:00, 09:00, or 10:00.

At the preset time, if the mobile phone successfully obtains the time corresponding to the $i^{th}$ time source, the mobile phone performs positioning based on the $i^{th}$ time source, to update the positioning duration corresponding to the $i^{th}$ time source. If the mobile phone does not successfully obtain the time corresponding to the $i^{th}$ time source, the mobile phone may keep the positioning duration corresponding to the $i^{th}$ time source unchanged.

In this way, before step 1023, positioning duration corresponding to each time source in the at least two time sources is positioning duration corresponding to GPS positioning performed most recently, that is, previous GPS positioning performed based on the time source. The positioning duration corresponding to previous GPS positioning performed based on the time source may be used to predict the positioning duration of the GPS positioning performed by the mobile phone in step 104, and therefore shorter positioning duration corresponding to previous GPS positioning performed based on the time source indicates a higher priority of the time source.

On a basis of step 1051, when the mobile phone successfully obtains the times corresponding to the plurality of time sources in step 1023, a priority of a time source may be determined based on positioning duration of the time source, and therefore a time corresponding to a target time source having the highest priority is injected into the GPS chip.

For example, if the preset time interval is one hour, and if the at least two time sources include the NTP time source, the GPS reference time source, and the NITZ time source, in a specific example, referring to FIG. n and Table 3, the mobile phone separately performs GPS training at the time 08:00 and the time 09:00. In addition, at the time 08:00, the mobile phone successfully obtains the NTP time, the GPS reference time, and the NITZ time. At the time 09:00, the mobile phone successfully obtains the GPS reference time and the NITZ time. At the time 09:05, the mobile phone successfully obtains the GPS reference time and the NIP time.

TABLE 3

| 08:00-positioning training | | 09:00-positioning training | | 09:05-positioning task |
|---|---|---|---|---|
| Successful obtaining | Positioning duration | Successful obtaining | Positioning duration | Successful obtaining |
| NTP time | 8 ms | | 10 ms | NTP time |

TABLE 3-continued

| | 08:00-positioning training | | 09:00-positioning training | | 09:05-positioning task |
|---|---|---|---|---|---|
| GPS reference time | 10 ms | GPS reference time | 9 ms | GPS reference time | |
| NITZ time | 13 ms | NITZ time | 12 ms | | |

In the case shown in FIG. 3, the mobile phone receives a positioning request of a user at the time 09:05, time sources corresponding to a time that is successfully obtained at the time 09:01 are the NTP time source and the GPS reference time source, positioning duration that is in positioning duration determined last time at the time 09:00 and that is corresponding to the GPS reference time source is the shortest, and therefore the mobile phone may determine that the priority of the GPS reference time source is the highest, and the GPS reference time source is the target time source.

It should be noted that, an example of a specific time value of the positioning duration in Table 3 is merely used to make a comparison between positioning duration corresponding to different time sources, and is not construed as a limitation to a specific time value of the positioning duration.

Further, after step 1051, the method may further include the following step:

1052. The mobile phone sets the positioning duration corresponding to the $i^{th}$ time source to a valid status, and updates an obtaining time corresponding to the $i^{th}$ time source, where the obtaining time is a time at which the mobile phone obtains the positioning duration.

On a basis of the foregoing step 1052, the method may further include the following step:

1053. At the preset time, if the mobile phone does not successfully obtain a time corresponding to the $i^{th}$ time source, and a difference between the time at which the $i^{th}$ time source is obtained and the obtaining time corresponding to the $i^{th}$ time source is greater than or equal to a preset time length, the mobile phone sets the positioning duration corresponding to the $i^{th}$ time source to an invalid status, and updates the obtaining time corresponding to the $i^{th}$ time source to the time at which the $i^{th}$ time source is obtained.

The time at which the $i^{th}$ time source is obtained may be a time at which the mobile phone requests to obtain the $i^{th}$ time source. Actually, in step 1053, the mobile phone does not successfully obtain the $i^{th}$ time source. The difference between the time at which the $i^{th}$ time source is obtained and the obtaining time in step 1053 may be referred to as an update interval. When the update interval is greater than or equal to the preset time length, it may indicate that the positioning duration corresponding to the $i^{th}$ time source has not been updated for a long time, the positioning duration corresponding to the $i^{th}$ time source is not accurate enough and has no reference value any more, and therefore the positioning duration may be set to an invalid status.

In addition, a specific value of the preset time length in step 1053 may be set according to an actual requirement, for example, may be 24 hours. The preset time interval in step 1051 may be shorter, for example, shorter than the preset time length in step 1053. In this way, the update interval of the positioning duration may be usually shorter than the preset time length, so that positioning duration in a valid status may be obtained.

FIG. 10 is a brief flowchart of performing positioning training by the mobile phone in step 1051 to step 1053. The mobile phone may separately perform a positioning operation at a preset time within each training period based on a time that is corresponding to each time source and that is currently obtained, to update positioning duration corresponding to each time source, and set, when it is determined that the update interval is greater than or equal to the preset time length, the positioning duration corresponding to the time source to an invalid status.

On a basis of step 1051 to step 1053, step 1023 may specifically include the following steps:

10231. The mobile phone determines, in m time sources corresponding to times that are successfully obtained, p (positive integer) time sources as time sources whose positioning duration are in valid statuses.

10232. The mobile phone determines that a time source having the shortest positioning duration in the p time sources is the target time source having the highest priority.

In the foregoing step 10231, when the positioning duration is in a valid status, it may indicate that the update interval of the positioning duration is shorter, and has a reference value. In the foregoing step 10232, the time source determined by the mobile phone based on the shortest positioning duration is currently the most accurate time source. The mobile phone may perform satellite searching more quickly based on the most accurate time source, thereby reducing a quantity of iterations of position calculation, and improving the GPS positioning speed more effectively.

For example, if the preset time interval is one hour, and the at least two time sources include the NTP time source, the GPS reference time source, and the NITZ time source, in a specific example, referring to Table 4, the mobile phone separately performs GPS training at the time 08:00 and the time 09:00. In addition, the mobile phone obtains the NTP time and the NITZ time at each of the time 08:00 and 09:00.

TABLE 4

| | 08:00-positioning training | | | 09:00-positioning training | | | 09:05-positioning task |
|---|---|---|---|---|---|---|---|
| | Successful obtaining | Positioning duration | Status | Successful obtaining | Positioning duration | Status | Successful obtaining |
| | NTP time | 8 ms | Valid | NTP time | 10 ms | Valid | NTP time |
| | | 6 ms | Invalid | | 6 ms | Invalid | GPS reference time |
| | NITZ time | 13 ms | Valid | NITZ time | 12 ms | Valid | NITZ time |

In the case shown in Table 4, the mobile phone receives a positioning request of a user at the time 09:05, time sources corresponding to a time that is successfully obtained at the time 09:05 are the NTP time source, the GPS reference time source, and the NITZ time source, time sources whose positioning duration, in positioning duration determined last time at the time 09:00, are in valid statuses are the NTP time source and the NITZ time source, the positioning duration of the NTP time source is the shortest, and therefore the mobile phone may determine the NTP time source as the target time source. Although, it can be learned from Table 2 that, the positioning duration corresponding to the GPS reference time source is the shortest in the NTP time source, the GPS reference time source, and the NITZ time source that are corresponding to the time that is successfully obtained at the time 09:00, because the positioning duration corresponding to the GPS reference time source is in an invalid status and has no reference value, the GPS reference time source cannot be used as the target time source.

Further, after the foregoing step 103, the method provided in this embodiment of this application may further include the following step:

106. The mobile phone obtains positioning duration corresponding to the target time source when performing GPS positioning based on the target time.

When the mobile phone performs a GPS positioning task requested by the user, the mobile phone may update the positioning duration corresponding to the target time source.

In this way, positioning duration corresponding to a time source may be updated through GPS training that is performed periodically, and each time when an actual GPS positioning task is performed, the positioning duration corresponding to the target time source may also be updated. Therefore, positioning duration corresponding to each time source may be latest positioning duration corresponding to a latest GPS operation, so that the positioning duration can reflect a real-time status of a time currently required by the mobile phone to perform positioning.

In addition, in this embodiment of this application, a priority corresponding to a time source varies with a real-time positioning scenario in which a GPS task requested by a user is performed. The positioning scenario may include but is not limited to a parameter such as a position where the mobile phone is located when the GPS task is performed, a network status of the mobile phone, a time interval corresponding to a time at which the GPS positioning task is performed, or a characteristic of the positioning task.

For example, when the GPS task is performed at home or in the company, a network status may be relatively good, and the mobile phone easily obtains the NTP time, and therefore may determine that the priority corresponding to the NTP time source is the highest. When the mobile phone performs the GPS task in a moving process in an open area, GPS signal quality may be higher, the network status may be poor, and the mobile phone easily obtains the GPS reference time, and therefore may determine that the priority of the GPS reference time source is the highest. When the mobile phone performs the GPS task in a shopping mall, both the network status and GPS signal quality are poor, and the mobile phone hardly obtains the NTP time and the GPS reference time, and therefore may determine that the priority corresponding to the NITZ time source is the highest.

For another example, when the mobile phone detects that the network status is better (for example, a network speed is high), the mobile phone easily obtains the NTP time, and therefore may determine that the priority corresponding to the NTP time source is the highest. When the mobile phone detects that the network status is poor, the mobile phone may hardly obtain the NTP time, and may determine that the priority corresponding to the NTP time is the lowest, and the priority of the NITZ time source is the highest.

For another example, when the mobile phone performs the GPS task in office hours, the network may be in an idle state, the mobile phone easily obtains the NTP time, and therefore may determine that the priority corresponding to the NTP time source is the highest. When the mobile phone performs the GPS task in off-duty hours, the network may be in a busy state, and the mobile phone may hardly obtain the NTP time, and therefore the mobile phone may determine that the priority corresponding to the NITZ time source is the highest.

For another example, in a process in which the mobile phone continuously performs the GPS task (for example, navigation), the mobile phone easily obtains a GPS signal, and therefore may determine that the priority corresponding to the GPS reference time source is the highest.

For another example, when the GPS task is performed, if a time interval away from a time at which a previous GPS task is successfully performed is less than or equal to a preset time threshold, it may be determined that the priority of the GPS reference time source is the highest. The preset time threshold may be less than the preset time length.

Further, in this embodiment of this application, historical statistical data may be stored in the mobile phone, and is used to make statistics on a correspondence between a positioning scenario and a target time. The positioning scenario may include but is not limited to a parameter such as a position where the mobile phone is located when the GPS task is performed, a network status of the mobile phone, a time interval corresponding to a time at which the GPS positioning task is performed, or a characteristic of the positioning task. In this case, the mobile phone may determine, based on the statistical data, the target time source having the highest priority in the at least two time sources.

In other words, the mobile phone may determine one target time in one or more time sources based on the historical statistical data with reference to a real-time scenario in which GPS positioning is currently performed.

For example, the statistical data may include a quantity of times that a time source is selected as a target time when a GPS operation is performed by the mobile phone at home in the past. When performing a current GPS positioning task at home, the mobile phone may determine, in one or more time sources based on a quantity of times that is recorded in the statistical data and that a time source is selected as the target time when the GPS operation is performed at home in the past, a time source that is most frequently determined as the target time in the past as the target time of the GPS positioning task.

For example, for the historical statistical data stored in the mobile phone, refer to the following Table 5.

TABLE 5

| Position | Target time source | A quantity of times |
|---|---|---|
| Company | NTP time source | 10 |
|  | NG time source | 2 |
|  | NITZ time source | 1 |
| Outdoors | GPS reference time source | 12 |
|  | NG time source | 5 |
|  | NTP time source | 3 |
| Home | NTP time source | 9 |
|  | NN time source | 4 |
|  | NITZ time source | 1 |

In the scenario shown in Table 5, the at least two time sources in step 101 include the six time sources: the NTP time source, the NG time source, the NITZ time source, the NG time source, the GN time source, and the NN time source, and the mobile phone successfully obtains the times currently corresponding to the six time sources. In the historical statistical data, when the GPS positioning operation is performed at home, the NTP time source is most frequently used as the target time source, so that when the mobile phone currently performs a GPS task, the mobile phone may determine the NTP time source as the target time source.

Alternatively, when performing a GPS task at home, the mobile phone may determine, based on a descending order of a quantity of times, recorded in the statistical data, that different time sources are separately determined as the target time source when the GPS operation is performed at home, a priority corresponding to a time source, and therefore determine the target time source based on the priority corresponding to the time source.

In some other embodiments, the mobile phone may first determine, after delivery, a priority of a time source based on positioning duration or a real-time scenario, and therefore determine a target time based on the priority corresponding to the time source, and record historical statistical data. However, after a relatively long period of time (for example, after one month or half a year), the mobile phone may determine the target time based on the historical statistical data. After a relatively long period of time, an amount of data collected in the statistical data is larger, more scenarios are included, more parameters are included, statistical information is more sophisticated, and in this case, the target time may be determined more accurately based on the statistical data.

In some other embodiments, a priority corresponding to a time source may also be obtained from a server. Specifically, after the mobile phone determines the target time, the mobile phone may report the target time to the server, and the server makes statistics, based on big data reported by a plurality of electronic devices and a plurality of users, on a quantity of times that each time source is determined as the target time, so that priorities respectively corresponding to the plurality of time sources are determined based on a descending order of the quantity of times. Further, the mobile phone may further report related scenario information (for example, a time, and a position) to the server when reporting the target time, so that the server makes statistics, based on different scenarios, on the quantity of times that each time source is determined as the target time, so as to determine, for different scenarios, the priorities respectively corresponding to the plurality of time sources. The mobile phone may obtain, from the server periodically or when a GPS positioning task is performed, the priorities respectively corresponding to the plurality of time sources.

Figure 12:
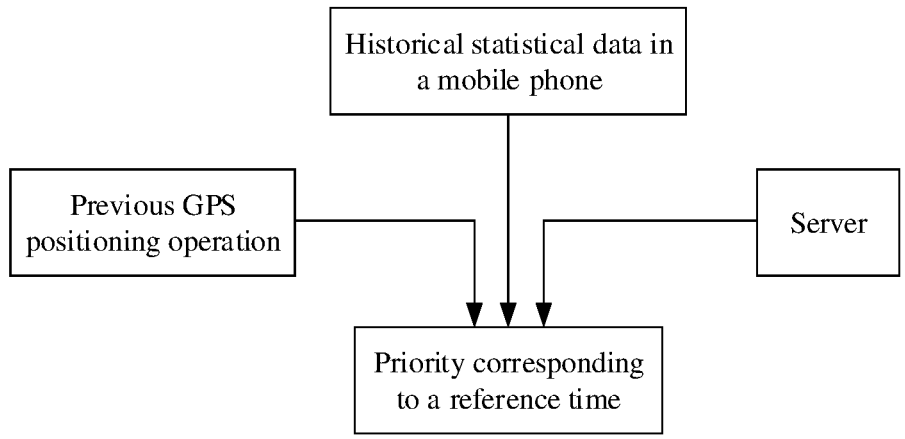
FIG. 12 is a schematic diagram of an obtaining manner of a priority according to an embodiment of this application.

In other words, referring to FIG. 12, a priority corresponding to a time source may be obtained based on a previous GPS positioning operation (GPS positioning training or a GPS positioning task), or may be obtained based on historical statistical data stored in the mobile phone, or may be obtained from the server.

Figure 13:
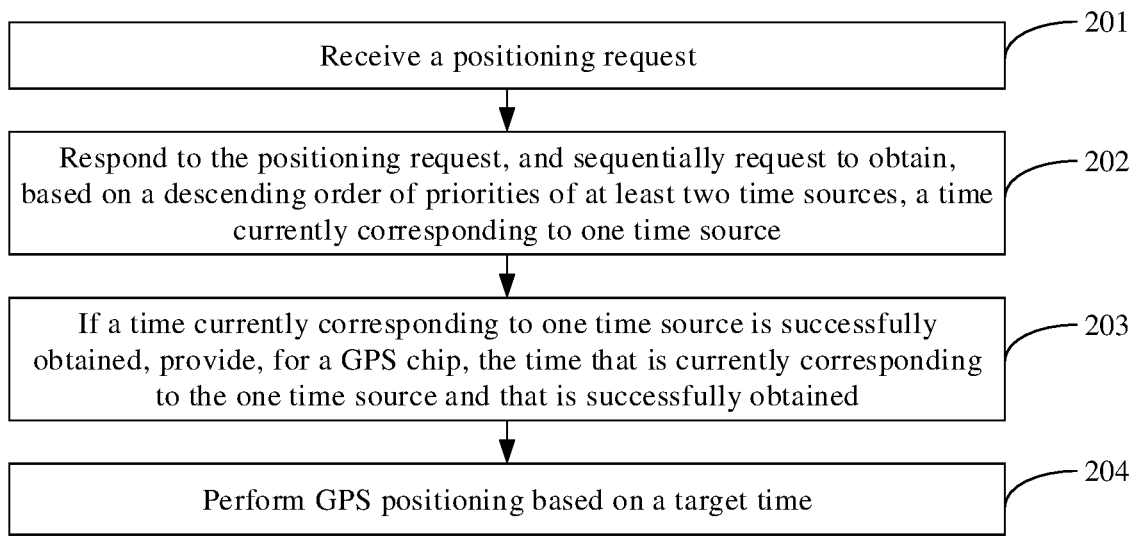
FIG. 13 is a flowchart of another positioning method according to an embodiment of this application.

In another implementation, referring to FIG. 13, a method provided in an embodiment of this application may include the following steps:

201. A mobile phone receives a positioning request.

202. The mobile phone responds to the positioning request, sequentially requests to obtain, based on a descending order of priorities of at least two time sources, a time currently corresponding to one time source.

The priorities of the at least two time sources may be determined according to the method described in the foregoing embodiment, for example, based on positioning training and positioning duration of a time source; or determined based on historical statistical data of the mobile phone; or obtained from a server. Details are not described herein.

203. If a time currently corresponding to one time source is successfully obtained, the mobile phone provides, for a GPS chip, the time that is currently corresponding to the one time source and that is successfully obtained.

When the mobile phone sequentially requests to obtain, based on the descending order of priorities of the at least two time sources, a time currently corresponding to a time source, if the mobile phone successfully obtains a time currently corresponding to one time source, the time source is a time source having the highest priority in time sources corresponding to the time that may be currently obtained, and therefore the mobile phone may determine the time source as a target time source.

In another specific implementation, when a status of positioning duration corresponding to a time source is stored in the mobile phone, in step 203, if the mobile phone successfully obtains a time currently corresponding to one time source, and positioning duration corresponding to the time source is in a valid status, the mobile phone may determine the time source as the target time source. In this way, the target time source determined by the mobile phone is a time source having the highest priority and a reference value in time sources currently corresponding to a time that may be currently obtained by the mobile phone.

204. The mobile phone performs GPS positioning based on a target time.

For descriptions of step 201 and step 204, refer to related descriptions of the foregoing step 101 and step 104.

Similar to the method embodiment described in steps 101 to 104, according to the method corresponding to steps 201 to 204, reliability and accuracy of a time parameter that is to be injected into the GPS chip may also be improved, thereby improving a GPS positioning speed.

In addition, the method for determining the target time provided in this embodiment of this application includes a method for obtaining a priority of a time source through dynamic training, so that the method may be used as time auxiliary data required during GPS positioning, and may also be used as time auxiliary data required by a Beidou navigation system of the mobile phone, and all other modules or fields of the mobile phone that have an accurate requirement on time and that are sensitive to time.

It may be understood that, to implement the foregoing functions, an electronic device includes a corresponding hardware structure and/or software module for performing each of the functions. A person skilled in the art should be easily aware that, in combination with example devices and algorithm steps described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Division of function modules may be performed on the electronic device according to the foregoing method examples in the embodiments of this application. For example, each of the function modules may be divided in correspondence to each function, or two or more functions may be integrated into one processing module. The integrated module may be implemented in a form of hardware, or may be implemented in a form of a software function module. It should be noted that the division of the modules in the embodiments of this application is an example, and is merely logical function division, and there may be another division manner during actual implementation.

Figure 14:
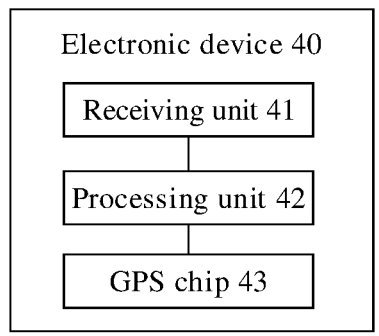
FIG. 14 is a schematic structural diagram of another electronic device according to an embodiment of this application.

In a case that function modules are divided based on corresponding functions, FIG. 14 is a schematic diagram of possible composition of an electronic device 40 in the foregoing embodiments. As shown in FIG. 14, the electronic device 40 may include a receiving unit 41, a processing unit 42, and a GPS chip 43.

In some embodiments, the receiving unit 41 may be configured to receive a positioning request. The processing unit 42 may be configured to: respond to the positioning request, determine a target time source having the highest priority in at least two time sources, and provide, for the GPS chip, a target time currently corresponding to the target time source. The GPS chip 43 may be configured to perform GPS positioning based on the target time. The at least two time sources include at least two of the following: a network time protocol NTP time source, a GPS reference time source, a network identity and time zone NITZ time source, an NG time source, an NN time source, or an NG time source. A time corresponding to the GPS reference time source is obtained based on a satellite time obtained through demodulation during previous GPS positioning.

In addition, the processing unit 41 may be further configured to support the electronic device 40 in performing steps 105 and 106 in FIG. 10, and steps 1021 to 1023, step 1051 to step 1053, or steps 10231 and 10232 in the foregoing method embodiment. The processing unit 41 and the GPS chip 42 may be further configured to perform other processes of the technologies described in the specification. For descriptions of functions of the corresponding modules, all related content of the steps in the foregoing method embodiment can be quoted, and details are not described herein again.

In some other embodiments, the receiving unit 41 may be configured to receive a positioning request. The processing unit 42 may be configured to respond to the positioning request, and sequentially request to obtain, based on a descending order of priorities of at least two time sources, a time currently corresponding to one time source. If a time currently corresponding to one time source is successfully obtained, the mobile phone provides, for the GPS chip, the time that is currently corresponding to the time source and that is successfully obtained. The GPS chip 43 may be configured to perform GPS positioning based on the target time.

Certainly, the electronic device may include but is not limited to the unit modules enumerated above. For example, the electronic device may further include a storage unit, where the storage unit is configured to store program code and related data of the electronic device, for example, positioning duration corresponding to a time source, an obtaining time, a status of the positioning duration, and the like. The electronic device may further include a sending unit, which may be configured to send data or a signal to another device. In addition, functions that can be specifically implemented by the foregoing functional unit may include but are not limited to functions corresponding to method steps in the foregoing embodiment, and for detailed descriptions of other units of the electronic device, refer to detailed descriptions of method steps corresponding to the electronic device. Details are not described herein in the embodiments of this application.

The processing unit 41 in FIG. 14 may be a processor or a controller, for example, may be a central processing unit (Central Processing Unit, CPU), a general purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The processing unit 42 may implement or execute various exemplary logical blocks, modules, and circuits that are described with reference to the content disclosed in this application. Alternatively, the processor may be a combination implementing a computing function, for example, a combination of one or more microprocessors, or a combination of the DSP and a microprocessor. The storage unit may be a memory. A communications unit may be a transceiver, an RF circuit, a communications interface, or the like. It can be understood that, functions of the GPS chip 42 may also be integrated into the processor.

When the processing unit 41 in FIG. 14 is the processor, the receiving unit is the RF circuit, and the storage unit is the memory, the electronic device provided in the embodiments of this application may be the mobile phone shown in FIG. 7. The communications unit may further include a WiFi module and a Bluetooth module.

The foregoing descriptions about implementations allow a person skilled in the art to understand that, for the purpose of convenient and brief description, division of the foregoing function modules is used as an example for illustration. In actual application, the foregoing functions can be allocated to different modules and implemented according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed in different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The computer software product is stored in a storage medium and includes several instructions for instructing a device (which may be a single-chip microcomputer, or a chip), or a processor (processor), to perform all or a part of the steps of the methods described in the embodiments of this application. The foregoing storage medium includes: any medium that can store program code, such as a USB flash drive, a removable hard disk, a read-only memory (read only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
receiving, by an electronic device, a positioning request, the electronic device comprising a global positioning (GPS) chip;
determining, by the electronic device in response to receiving the positioning request, a target time source having the highest priority in at least two time sources, the at least two time sources comprising at least two of the following:
a network time protocol (NTP) time source;
a GPS reference time source, wherein a time corresponding to the GPS reference time source is based on a satellite time obtained through demodulation during previous GPS positioning;
a network identity and time zone (NITZ) time source;
an NG time source, wherein a time corresponding to the NG time source is an average value of time between a time corresponding to the NTP time source and the time corresponding to the GPS reference time source;
an NN time source, wherein a time corresponding to the NN time source is an average value of the time corresponding to the NTP time source and a time corresponding to the NITZ time source; or
a GN time source, wherein a time corresponding to the GN time source is an average value of the time corresponding to the GPS reference time source and the time corresponding to the NITZ time source;
providing, for the GPS chip, a target time currently corresponding to the target time source; and
performing GPS positioning based on the target time.

2. The method according to claim 1, wherein a time source having a shorter positioning duration indicates a higher priority of the time source; the positioning duration of the time source is a positioning duration of a previous GPS positioning performed based on a time corresponding to the time source; and the positioning duration is a length of time spent on a positioning calculation.

3. The method according to claim 1, wherein before the determining a target time source having the highest priority in at least two time sources, the method further comprises:
separately performing a positioning operation periodically at a preset time interval based on a time that corresponds to each time source and that is currently obtained, and obtaining a positioning duration corresponding to each time source.

4. The method according to claim 1, wherein after the providing, for the GPS chip, a target time currently corresponding to the target time source, the method further comprises:
obtaining, when GPS positioning is performed based on the target time, a positioning duration corresponding to the target time source.

5. A method, comprising:
receiving, by an electronic device, a positioning request, the electronic device comprising a global positioning (GPS) chip;
sequentially requesting to obtain, in response to receiving the positioning request and based on a descending order of priorities of at least two time sources, a time currently corresponding to one time source, the at least two time sources comprising at least two of the following:
a network time protocol (NTP) time source;
a GPS reference time source, wherein a time corresponding to the GPS reference time source is based on a satellite time obtained through demodulation during previous GPS positioning;
a network identity and time zone (NITZ) time source;
an NG time source, wherein a time corresponding to the NG time source is an average value of time between a time corresponding to the NTP time source and the time corresponding to the GPS reference time source;
an NN time source, wherein a time corresponding to the NN time source is an average value of the time corresponding to the NTP time source and a time corresponding to the NITZ time source; or
a GN time source, wherein a time corresponding to the GN time source is an average value of the time corresponding to the GPS reference time source and the time corresponding to the NITZ time source;
in response to determining, by the electronic device, that a time currently corresponding to one time source is successfully obtained, providing, for the GPS chip, a target time that is the time currently corresponding to the one time source that is successfully obtained; and
performing GPS positioning based on the target time.

6. An electronic device, comprising:
a global positioning system (GPS) chip;
at least one processor; and
a memory coupled to the at least one processor and configured to store programming instructions that, when executed by the at least one processor, cause the electronic device to perform operations comprising:
receiving a positioning request;
determining, in response to receiving the positioning request, a target time source having the highest priority in at least two time sources the at least two time sources comprising at least two of the following:
a network time protocol (NTP) time source;
a GPS reference time source, wherein a time corresponding to the GPS reference time source is based on a satellite time obtained through demodulation during previous GPS positioning;
a network identity and time zone (NITZ) time source;
an NG time source, wherein a time corresponding to the NG time source is an average value of time between a time corresponding to the NTP time source and the time corresponding to the GPS reference time source;
an NN time source, wherein a time corresponding to the NN time source is an average value of the time corresponding to the NTP time source and a time corresponding to the NITZ time source; or
a GN time source, wherein a time corresponding to the GN time source is an average value of the time corresponding to the GPS reference time source and the time corresponding to the NITZ time source;

providing, for the GPS chip, a target time currently corresponding to the target time source; and performing GPS positioning based on the target time.

7. The electronic device of claim 6, wherein a time source having a shorter positioning duration indicates a higher priority of the time source; the positioning duration corresponding to the time source is positioning duration of previous GPS positioning performed based on a time corresponding to the time source; and the positioning duration is a length of time spent on positioning calculation.

8. The electronic device of claim 6, wherein the operations further comprise:

separately performing a positioning operation periodically at a preset time interval based on a time that corresponds to each time source and that is currently obtained, and obtaining positioning duration corresponding to each time source.

9. The electronic device of claim 6, wherein the operations further comprise:

obtaining, when GPS positioning is performed based on the target time, a positioning duration corresponding to the target time source.

10. The electronic device of claim 6, wherein an NTP time currently corresponding to the NTP time source is obtained by the electronic device in real time from an NTP server through a network, and an NITZ time currently corresponding to the NITZ time source is a current time value obtained by the electronic device in real time from an access network device.

11. The electronic device of claim 6, wherein the operations further comprise: the electronic device failing to obtain a time value currently corresponding to a specific time source, or when a time value that is currently corresponding to a specific time source that is obtained by the electronic device is an invalid value indicates that the electronic device fails to obtain the time currently corresponding to the time source.

12. The electronic device of claim 6, wherein the operations further comprise: when the electronic device successfully obtains only one time source and a priority of the time source corresponding to the time that is successfully obtained is the highest, the time source corresponding to the time that is successfully obtained is the target time source.

13. The electronic device of claim 6, wherein the operations further comprise: in response to the electronic device successfully obtaining times currently corresponding to m time sources, where m is a positive integer and priorities of the m time sources are higher than a priority of another time source, determining a target time source having the highest priority in the m time sources.

14. The method of claim 1, wherein an NTP time currently corresponding to the NTP time source is obtained by the electronic device in real time from an NTP server through a network, and an NITZ time currently corresponding to the NITZ time source is a current time value obtained by the electronic device in real time from an access network device.

15. The method of claim 1, wherein the electronic device failing to obtain a time value currently corresponding to a specific time source, or when a time value that is currently corresponding to a specific time source that is obtained by the electronic device is an invalid value indicates that the electronic device fails to obtain the time currently corresponding to the time source.

16. The method of claim 1, wherein the electronic device successfully obtains only one time source, a priority of the time source corresponding to the time that is successfully obtained is the highest, and the electronic device determines that the time source corresponding to the time that is successfully obtained is the target time source.

17. The method of claim 1, wherein the electronic device successfully obtains times currently corresponding to m time sources, where m is a positive integer, priorities of the m time sources are higher than a priority of another time source, and the electronic device determines a target time source having the highest priority in the m time sources.

18. The method of claim 5, wherein a status of a positioning duration corresponding to the one time source is stored in the electronic device, the electronic device successfully obtains a time currently corresponding to the one time source, and a positioning duration corresponding to the time source is in a valid status, the electronic device may determine the time source as a target time source.

19. The method of claim 5, wherein the at least two time sources are determined according to positioning training and positioning duration of a time source or historical statistical data of the electronic device; or the at least two time sources are obtained from a server.

20. The method of claim 5, wherein a priority of a time source is obtained through dynamic training.

* * * * *